United States Patent
Wilke et al.

(10) Patent No.: US 11,664,972 B2
(45) Date of Patent: May 30, 2023

(54) METHOD FOR LINKING A FIRST DATA BLOCK TO A SECOND DATA BLOCK, METHOD FOR CHECKING THE INTEGRITY OF A BLOCKCHAIN STRUCTURE, DEVICE AND COMPUTER PROGRAM PRODUCT

(71) Applicant: Bundesdruckerei GmbH, Berlin (DE)

(72) Inventors: Andreas Wilke, Berlin (DE); David Fabian, Berlin (DE); Ilya Komarov, Berlin (DE)

(73) Assignee: Bundesdruckerei GmbH, Berlin (DE)

( * ) Notice: Subject to any disclaimer, the term of this patent is extended or adjusted under 35 U.S.C. 154(b) by 409 days.

(21) Appl. No.: 16/762,874

(22) PCT Filed: Nov. 5, 2018

(86) PCT No.: PCT/EP2018/080131
§ 371 (c)(1),
(2) Date: May 8, 2020

(87) PCT Pub. No.: WO2019/091901
PCT Pub. Date: May 16, 2019

(65) Prior Publication Data
US 2020/0287707 A1 Sep. 10, 2020

(30) Foreign Application Priority Data
Nov. 10, 2017 (DE) .................... 10 2017 126 349.7

(51) Int. Cl.
*H04L 29/06* (2006.01)
*H04L 9/06* (2006.01)
(Continued)

(52) U.S. Cl.
CPC ........ *H04L 9/0637* (2013.01); *G06F 16/9024* (2019.01); *H04L 9/0643* (2013.01); *H04L 63/12* (2013.01); *H04L 9/50* (2022.05)

(58) Field of Classification Search
CPC ..... H04L 9/0637; H04L 9/0643; H04L 63/12; H04L 9/50; H04L 63/123; H04L 9/3239; G06F 16/9024; G06F 21/64
See application file for complete search history.

(56) References Cited

U.S. PATENT DOCUMENTS 9,774,578 B1 * 9/2017 Ateniese ............... H04L 9/0643
10,158,480 B1 * 12/2018 Winklevoss .......... H04L 9/3247
(Continued)

FOREIGN PATENT DOCUMENTS

| CN | 101 329 656 B | 12/2008 |
|---|---|---|
| WO | WO 2007/129187 A1 | 11/2007 |
| WO | WO 2018/177662 A1 | 10/2018 |

OTHER PUBLICATIONS

Ford, Bryan: How Do You Know It's on the Blockchain? With a Skipchain. Bryan Ford's Blog, Aug. 1, 2017; 12 pgs.
(Continued)

*Primary Examiner* — Mahfuzur Rahman
(74) *Attorney, Agent, or Firm* — Holland & Hart LLP (57) ABSTRACT

A method for obtaining a blockchain structure includes providing a first data block and a second data block, wherein a first data processing rule is assigned to first data of the first data block, and a second data processing rule is assigned to second data of the second data block. The first data processing rule is linked to the second data processing rule to obtain a third data processing rule, wherein the first data processing rule is executed before the second data processing rule when the third data processing rule is executed. The second data processing rule is linked to the first data processing rule to obtain a fourth data processing rule. When
(Continued)

the fourth data processing rule is executed, the first data processing rule is executed after the second data processing rule. The third data processing rule is stored in the second data block and the fourth data processing rule is stored in the first data block to obtain the blockchain structure.

12 Claims, 9 Drawing Sheets

(51) Int. Cl.
　　　*G06F 16/901*　　(2019.01)
　　　*H04L 9/40*　　　(2022.01)
　　　*H04L 9/00*　　　(2022.01)

(56) References Cited

U.S. PATENT DOCUMENTS

| | | | |
|---|---|---|---|
| 10,915,891 B1* | 2/2021 | Winklevoss | H04L 9/3255 |
| 11,139,081 B2* | 10/2021 | Tran | G16H 50/70 |
| 2012/0250856 A1 | 10/2012 | Pasini et al. | |
| 2013/0101118 A1 | 4/2013 | Seleznev et al. | |
| 2016/0028552 A1* | 1/2016 | Spanos | H04L 9/3268 |
| | | | 713/178 |
| 2016/0292396 A1 | 10/2016 | Ackerwell | |
| 2018/0075527 A1* | 3/2018 | Nagla | G06Q 40/025 |
| 2020/0389309 A1* | 12/2020 | Ricotta | H04L 9/3239 |
| 2021/0211271 A1* | 7/2021 | Kuang | H04L 9/3239 |

OTHER PUBLICATIONS

Nikitin, Kirill et al.: CHAINIAC: Proactive Software-Update Transparency via Collectively Signed Skipchains and Verified Builds. Proceedings of the 26th USENIX Conference on Security Symposium, 5. Jul. 2017; 18 pgs.

Watanabe, Hiroki et al.: Blockchain contract: A complete consensus using block chain. In: 2015 IEEE 4th Global Conference on Consumer Electronics (GCCE). IEEE, 2015. S. 577-578, DOI: 10.1109/GCCE.2015.7398721; 2 pgs.

Kokoris-Kogias, Eleftherios et al.: Managing identities using blockchains and CoSi. In: 9th Workshop on Hot Topics in Privacy Enhancing Technologies (HotPETs 2016), 2016; 2 pgs.

Mohammed Rangwala et al: "A Mutual Agreement Signature Scheme for Secure Data Provenance"; Dec. 31, 2014 (Dec. 31, 2014), XP055476791, ISBN: 978-1-4799-3572-7, gefunden im Internet: URL:https://www.science.iupui.edu/~xkzou/Papers/ICCDN14_Digital_Provenance.pdf [gefunden am May 18, 2018]) und; 8 pgs.

Kokoris-Kogias, Eleftherios et al.: Managing identities using blookchains and CoSi. In: 9th Workshop on Hot Topics in Privacy Enhancing Technologies (HotPETs 2016), 2016; 2 pgs.

* cited by examiner

METHOD FOR LINKING A FIRST DATA BLOCK TO A SECOND DATA BLOCK, METHOD FOR CHECKING THE INTEGRITY OF A BLOCKCHAIN STRUCTURE, DEVICE AND COMPUTER PROGRAM PRODUCT

CROSS-REFERENCES

The present application is a national stage entry under 35 U.S.C. § 371 of International Application No. PCT/EP2018/080131, entitled "METHOD FOR LINKING A FIRST DATA BLOCK TO A SECOND DATA BLOCK, METHOD FOR CHECKING THE INTEGRITY OF A BLOCKCHAIN STRUCTURE, DEVICE, AND COMPUTER PROGRAM PRODUCT," filed 5 Nov. 2018, which claims the benefit of German Patent Application No. 10 2017 126 349.7, entitled "VERFAHREN ZUM VERKNUEPFEN EINES ERSTEN DATENBLOCKS MIT EINEM ZWEITEN DATENBLOCK, VERFAHREN ZUM UEBERPRUEFEN DER INTEGRITAET EINER BLOCKCHAIN-STRUKTUR, VORRICHTUNG UND COMPUTERPROGRAMMPRODUKT," filed 10 Nov. 2017. Both of these applications are incorporated herein by reference for all purposes.

FIELD OF THE DISCLOSURE

The present disclosure relates to a method for linking a first data block to a second data block in order to obtain a blockchain structure, two methods for checking the integrity of a blockchain structure which links a first data block with a second data block, a device for linking a first data block with a second data block to obtain a blockchain structure and a computer program product.

BACKGROUND

The storage of data should generally be tamper-proof. This means that stored data should not be able to be changed unnoticed by unauthorized third parties. For this purpose, data can be stored in data blocks that are linked together. Such a link can be used to create a so-called blockchain. Such a blockchain comprises data blocks with data to be stored and security features, wherein the data blocks are linked to one another, so that manipulation of an individual data block becomes apparent in subsequent blocks.

For this purpose, check values can be stored in the subsequent blocks, for example using a hash method. If a block is manipulated within the blockchain, the check values in the following data blocks differ from the previously stored data blocks.

Such a blockchain can lead to bifurcations, with the main path typically being defined by a majority decision of the user of the blockchain. However, the other bifurcations of the blockchain remain. This can lead to uncertainty in the data.

Because the check values are written into the following data blocks, it is noticeable if a previous data block has been manipulated, but it is conceivable that the last data block of the blockchain generated in this way can be removed or manipulated. Check values are stored in the following blocks. Since there is no subsequent block for this last block, there are no check values. Such manipulation is therefore not noticeable.

Furthermore, a data block in the blockchain, for example the penultimate data block, can be changed unnoticed if the following data blocks are adapted after the change of this data block. This can be done, for example, for the penultimate data block without much effort, since there is only one subsequent block that has to be changed.

Structures manipulated in this way can be discovered through external coordination processes. For example, blockchain users carry out a coordination procedure as to whether the data records are valid and which data records can be trusted.

SUMMARY

An object of the present disclosure is to provide an improved concept for a blockchain structure.

The object is solved by the features of the independent claims. Furthermore, examples are described in the dependent claims, the description and the figures.

According to a first aspect, the object of the present disclosure is achieved by a method for linking a first data block to a second data block, in order to obtain a block chain structure by the method. The first data block comprises first data to which a first data processing rule is assigned to. The second data block comprises second data. The method comprises: assigning a second data processing rule to the second data block based on the second data of the second data block; linking the first data processing rule with the second data processing rule in order to obtain a third data processing rule, wherein the first data processing rule is executed before the second data processing rule when the third data processing rule is executed; linking the second data processing rule with the first data processing rule in order to obtain a fourth data processing rule, wherein the first data processing rule is executed after the second data processing rule when the fourth data processing rule is executed; storing the third data processing rule in the second data block, and storing the fourth data processing rule in the first data block in order to obtain the block chain structure.

The blockchain structure that can be created by the method described above can be a blockchain structure with two entries, the first data block and the second data block. Likewise, it can be a blockchain with several data blocks, in which case either the first data block or the second data block is the last data block of the blockchain structure to which the respective other data block is to be appended. For example, such a blockchain structure comprises 499 entries, the first data block being the 499th and the second data block being a new data block which is to be appended as the 500th data block. A data block has an information part in which data to be stored is stored and it has a security part in which data is stored which serves to check the integrity of the blockchain structure.

A data processing rule describes a function that generates a result from input data. The first data processing rule and the second data processing rule are accordingly an rule to generate a data output from a data input.

The first data processing rule is linked to the second data processing rule to form a third data processing rule and a fourth data processing rule. The third data processing rule is stored in the second data block. The fourth data processing rule is stored in the first data block. In this way, a bidirectionally linked blockchain structure is obtained. With a bidirectionally linked blockchain structure of this type, a data block cannot be easily manipulated both within the blockchain structure and at its end without this becoming noticeable. Because the first data block contains information on the second data block and the second data block contains information on the first data block, neither of the two data blocks can be removed from the blockchain without this being apparent in the other data block. This protects in particular a last data block of the blockchain, here the second data block.

According to one example, the step of assigning comprises assigning by means of a predetermined assignment rule which assigns the second data processing rule to the second data or a data property of the second data.

In the assignment step, a second data processing rule is assigned to the second data block based on the second data. The step of assigning may comprise evaluating the second data in order to maintain the data property. For example, a character length of the second data or a number of characters within the second data is evaluated.

According to one example, according to the predetermined assignment rule the second data processing rule is assigned to the second data block, if multiple execution of the second data processing rule provides a predefined result.

The assignment rule can be adapted in such a way that a second data processing rule is assigned to the second data, which has predetermined characteristic properties. Here, these properties are, for example, that performing the same function in succession, i.e. applying the function to itself multiple times gives a constant value. This property of the data processing rule can later serve as a characteristic feature and as a security feature for checking the blockchain structure.

According to one example, the first data processing rule and the second data processing rule represent a mathematical function, in particular an analytical function.

A mathematical function can map data, for example input values, to output data. For example, this can be a list function in which further natural numbers are assigned to natural numbers. Such a list function comprises, for example, 3000 entries for a blockchain structure with 500 entries.

According to one example, the first data processing rule is replaced by the fourth data processing rule in the step of storing.

If the second data block is attached to the first data block, the first data block has already been attached to existing data blocks in the blockchain in an earlier step, if the first data block is not the start data block of the blockchain structure. In this case, the first data block already has a data processing rule that is stored in a security part of the first data block. For linking, and in particular for bidirectional linking of the blockchain with the second data block, the first data processing rule from the first data block is overwritten by the fourth data processing rule. The fourth data processing rule comprises the first data processing rule and the extension according to the step of linking with the second data processing rule.

According to one example, the assigned second data processing rule is stored to the second data block before the linking steps.

Here, the step of storing the third data processing rule in the second data block comprises replacing the second data processing rule with the third data processing rule.

When the second data block is created, the second data processing rule can be generated from the information part of the second data block and stored in the security part. Thus, an information part and a security part are created. In order not to change the structure of the second data block when it is linked to the blockchain, no new security part is created for storing the third data processing rule, but the second data processing rule in the security part of the second data block is overwritten by the third data processing rule.

According to one example, the first data processing rule is read out from the first data block before the linking steps. For example, if the first data block forms the last data block in a previously existing blockchain, a data processing rule is already stored in the security part of the first data block as the first data processing rule. This comprises information about the information part of the first data block, but also information about a previous data block of the blockchain structure, if it exists. In this case, the first data processing rule can be read out from the security part of the first data block. This can be seen as an assignment of the first data processing rule to the first data block. Likewise, the creation of the first data processing rule can serve as an assignment to the first data block.

According to one example, a hash value is created based on the first data and the first data processing rule of the first data block, and the hash value for the second data is stored in the second data block before the assignment step. An advantage of storing hash values in the information part of the second data block, which contains both values from the information part and the security part, i. e. comprising the first data and the first data processing rule of the first data block, can further increase the security of the blockchain structure. With the method described above, the security, in particular of the last data block of the blockchain structure, is increased. By adding hash values based on the previous data blocks, the blockchain structure is secured twice in both directions and the security of the first data blocks in the blockchain is increased.

According to one example, the second data processing rule comprises a hash property, wherein the second data cannot be reconstructed from the second data processing rule.

The second data processing rule, which is based on the second data, has hash value properties. This means that although the assignment of the second data to the second data processing rule is unambiguous, no information on the content of the second data can be obtained from the second data processing rule with acceptable effort. This increases data security, since when the second data processing rule is passed on to further data blocks, no content has to be exchanged about the second data.

According to a second aspect of the present disclosure, the object is achieved by a method for checking the integrity of a blockchain structure, which links a first data block with a second data block. Here, the first data block comprises first data and the second data block comprises second data. A first data processing rule is assigned to the first data and a second data processing rule is assigned to the second data. Here, the second data block comprises a link of the first data processing rule and the second data processing rule to a third data processing rule. The first data block comprises a link between the first data processing rule and the second data processing rule to a fourth data processing rule. When the third data processing rule is executed, the second data processing rule is executed after the first data processing rule. When the fourth data processing rule is executed, the second data processing rule is executed before the first data processing rule. The method comprises the characteristics of: assigning a fifth data processing rule to the second data block based on the second data of the second data block and assigning the second data processing rule to the second data; executing the fifth data processing rule in a predetermined order with the fourth data processing rule to obtain an execution result; and confirming the integrity of the block chain structure, when the execution result corresponds to a predetermined reference result.

A blockchain created according to the method described above is linked bidirectionally and has data processing rules stored in security parts of the data blocks that have been clearly identified. The assignment rules with which the first data processing rule from the first data and the second data processing rule from the second data have been assigned are known. On the basis of such an assignment of the second data processing rule to the second data and based on the second data, a fifth data processing rule is created. The fifth data processing rule has certain properties that can produce a clear check result regardless of the content of the first data or the content of the second data and other links between the first or second data processing rule and other data processing rules.

According to one example, the second data processing rule has the property that when the second data processing rule is executed several times in succession according to a predetermined number of executions, a constant value is generated. In the step of assigning a fifth data processing rule, the fifth data processing rule is formed by executing the second data processing rule several times in succession by one time less than the predetermined number of executions.

A property of the second data processing rule is hereby defined in more detail. In the method described above for linking a first data block to a second data block, this property is defined, for example, as an assignment rule. This provides a relatively simple possibility for generating the data processing rules with the desired properties.

According to one example, the integrity of the block chain structure is confirmed in the step of confirming if the result of the execution is a constant value.

According to a third aspect, the task is solved by a further method for checking the integrity of a blockchain structure. The blockchain structure links a first data block to a second data block, the first data block comprising first data and the second data block comprising second data. A first data processing rule is assigned to the first data and a second data processing rule is assigned to the second data. The second data block comprises a link of the first data processing rule and the second data processing rule to a third data processing rule. The first data block comprises a link of the first data processing rule and the second data processing rule to a fourth data processing rule. When the third data processing rule is executed, the second data processing rule is executed according to the first data processing rule. When the fourth data processing rule is executed, the second data processing rule is executed before the first data processing rule. The method has the following characteristics: reassigning a further second data processing rule to the second data block based on the second data of the second data block; reassigning a further first data processing rule to the first data block based on the first data of the first data block; linking the further first data processing rule with the further second data processing rule in order to obtain a further third data processing rule; comparing the third data processing rule with the further third data processing rule; confirming the integrity of the block chain structure, if the result of the comparison shows that the third data processing rule matches the further third data processing rule.

The recalculation of the individual data processing rules, in particular of each data block of the blockchain, represents a further possibility for checking a blockchain structure with the described properties.

According to a fourth aspect of the present disclosure, the object is achieved by a computer program product. The computer program product has program code for executing at least one of the methods described above when the program code is executed on a computer system According to a fifth aspect of the present disclosure, the object is achieved by a device for linking a first data block with a second data block in order to obtain a block chain structure. The first data block comprises first data and a first data processing rule. The second data block comprises second data. The device comprises a memory arrangement with a first memory area in which the first data block is stored and with a second memory area in which the second data block is stored. The device further comprises a processor which is configured to assign a second data processing rule to the second data block based on the second data of the second data block. In this case, the processor is further configured to link the first data processing rule with the second data processing rule in order to obtain a third data processing rule, the first data processing rule being executed before the second data processing rule when the third data processing rule is executed electronically. The processor is further configured to link the second data processing rule with the first data processing rule in order to obtain a fourth data processing rule, wherein when the fourth data processing rule is executed, the first data processing rule is executed after the second data processing rule. The processor is configured to store the third data processing rule in the second memory area to the second data block and to store the fourth data processing rule in the first memory area to the first data block in order to obtain the block chain structure.

The memory arrangement can comprise one or more servers, each of which has internal or external storage, such as a database. The individual data blocks can be located on a single memory but can be also distributed over several memories in different memory areas. For example, the first memory area in which the first data block is stored is located in a first memory that belongs to a first server. The second memory area is assigned to a second server, which is arranged at a different location, and the second data block is stored in this second memory area. Likewise, the two data blocks can also be stored in a single memory and occupy different memory areas of the one memory.

BRIEF DESCRIPTION OF THE DRAWINGS

The present disclosure is explained in more detail below with reference to figures and exemplary embodiments. In the figures.

DETAILED DESCRIPTION

Figure 1:
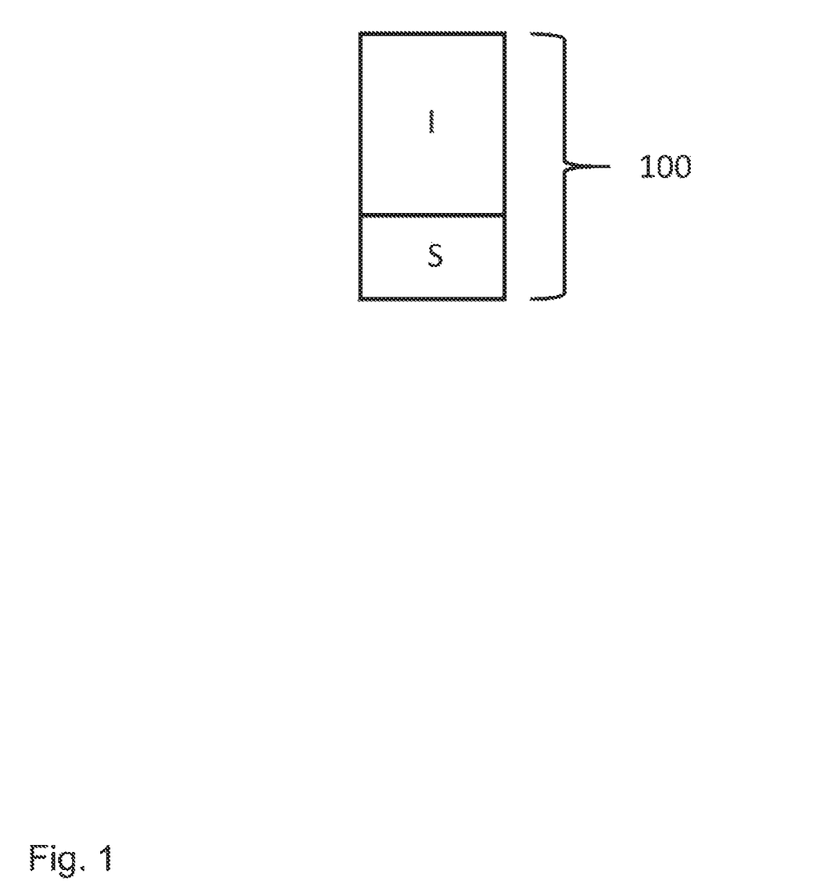
FIG. 1 shows a schematic representation of a data block according to an example of the present disclosure.

FIG. 1 shows a schematic representation of a data block 100. The data block 100 comprises an information part I and a security part S. Data which can be regarded as use data and comprise data to be stored are stored in information part I. In contrast, data are stored in the security part S, which serve the security of the data block or the security of a blockchain structure with which the data block 100 is linked.

The data block 100 is a logical construct that is created in a memory, such as a data server or a database.

Information to be stored is stored in information part I. If the information part I was created, the information, i.e. the data, in the information part I are no longer changed for linking the data block 100 with further data blocks.

The security part S of the data block 100 is adapted by the linkage with further data blocks. In particular, the security part S is adapted when the data block 100 is linked to another data block.

Figure 2A:
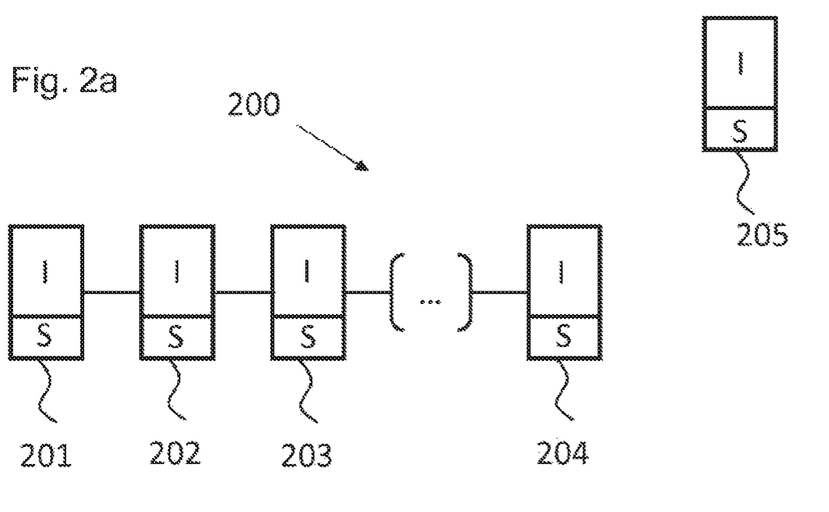
FIG. 2a shows a schematic representation of a blockchain structure and an individual data block according to an example of the present disclosure.

FIG. 2a shows a blockchain structure 200. The blockchain structure 200 comprises a number of already linked data blocks 201, 202, 203, 204. In each case, a start data block 201 and subsequent data blocks 202, 203, 204 are linked together. The linking continues in the example shown, which is indicated by the brackets and the points. A last block of the blockchain structure 200 is the first data block 204. For example, this is the 499th data block in the blockchain structure 200. Each of the data blocks 201 to 204 comprises an information part I and a security part S. In particular, the first data block 204 comprises an information part I and a security part S.

The information part I comprises data to be stored which has been stored together with the first data block 204. A first data processing rule a was created and stored in a security part S from these first data and from previous security parts S of the blockchain structure. The first data block 204 is thus bidirectionally linked with its predecessors of the blockchain structure 200.

FIG. 2a furthermore shows a second data block 205. The second data block 205 likewise has an information part I and a security part S. The second data block 205 is not yet linked to the blockchain structure 200 in the example shown in FIG. 2a.

Data is stored in information part I, which is to be stored with the second data block 205 and is to be added to the blockchain structure 200. A second data processing rule is stored in the security part S, which is based on the stored second data in the information part I.

Figure 2B:
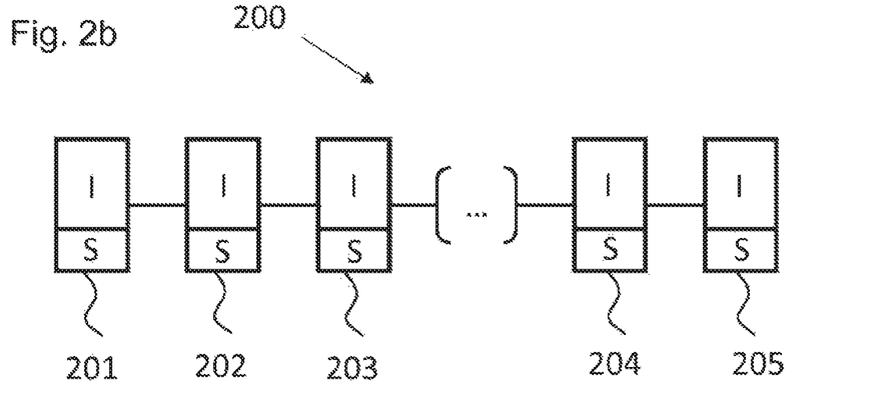
FIG. 2b shows the schematic representation of the blockchain structure according to FIG. 2a, the individual data block has been linked to the blockchain structure.

FIG. 2b shows the blockchain structure 200 from FIG. 2a, the first data block 204 having been linked to the second data block 205. The blockchain structure 200 now comprises the data blocks 201 to 204 as shown in FIG. 2a and additionally the second data block 205.

The manner in which the second data block 205 is added to the blockchain structure 200 is explained in detail below with reference to FIGS. 3a and 3b.

Figure 3A:
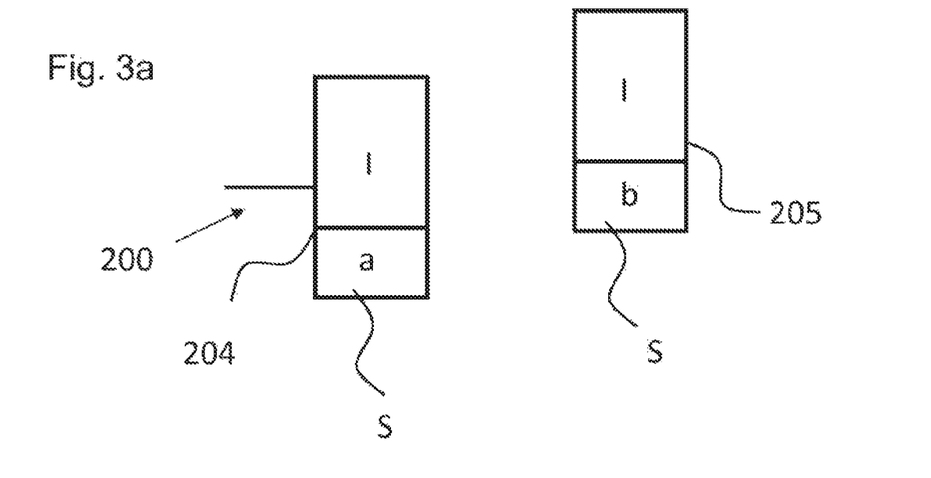
FIG. 3a shows a schematic representation of a data block of the blockchain structure according to FIG. 2a and of an individual data block.

FIG. 3a shows the first data block 204 and the second data block 205 according to the configuration and the linking state, as shown in FIG. 2a. In other words, the first data block 204 is already part of the blockchain structure 200 and represents the last data block in this blockchain structure 200. The second data block 205 has an information part I and the security part S. However, the second data block 205 has not yet been linked to the blockchain structure 200. A second data processing rule B is stored in the security part S of the second data block 205. A first data processing rule A is stored in the first data block 204 in the security part S.

In the example described, the first data processing rule A comprises data processing rules from preceding data blocks. In addition, the first data processing rule A comprises a data processing rule that is based on the first data in the information part I.

The second data processing rule B in the second security part S of the second data block 205 is based on the information part I, in particular on the first data stored there.

The second data processing rule B can be assigned to the first data on the basis of a predetermined assignment rule. In the example shown, the predetermined assignment rule comprises assigning the second data processing rule B to the second data, based on a comparison list. For this purpose, data properties, such as character length, number of characters, number of characters or other data properties of the second data, which can also be obtained with algorithms, are evaluated and, based on an evaluation result, the second data processing rule B is selected from a predetermined set of functions. The selection can also include adding characteristic values. In a further example, the second data processing rule B is not selected, but is calculated.

Figure 3B:
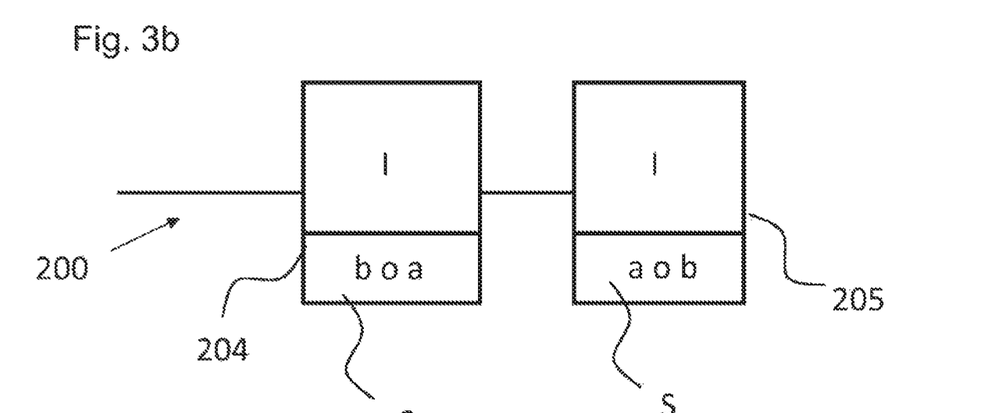
FIG. 3b shows a further schematic representation of the blockchain structure according to FIG. 3a, wherein the individual data block has been linked to the blockchain structure.

FIG. 3b shows the first data block 204 and the second data block 205, which are linked together and thus result in an expansion of the blockchain structure 200. A fourth data processing rule is stored in the first data block 204. A third data processing rule is stored in the security part S of the second data block 205. The third and fourth data processing rules have arisen from a series of the first and second data processing rules.

In the security part S of the second data block, the first data processing rule A and the second data processing rule B are entered in ascending order, this means to execute the third data processing rule, first the first data processing rule A and then the second data processing rule B are executed.

In the security part S of the first data block 204, the first data processing rule A and the second data processing rule B are entered in the reverse order, this means when the fourth data processing rule is executed, the second data processing rule B is executed first and then the first data processing rule A.

In this way, the first data block 204 and the second data block 205 are linked together bidirectionally. This is done for each data block of the blockchain structure 200.

Figure 3C:
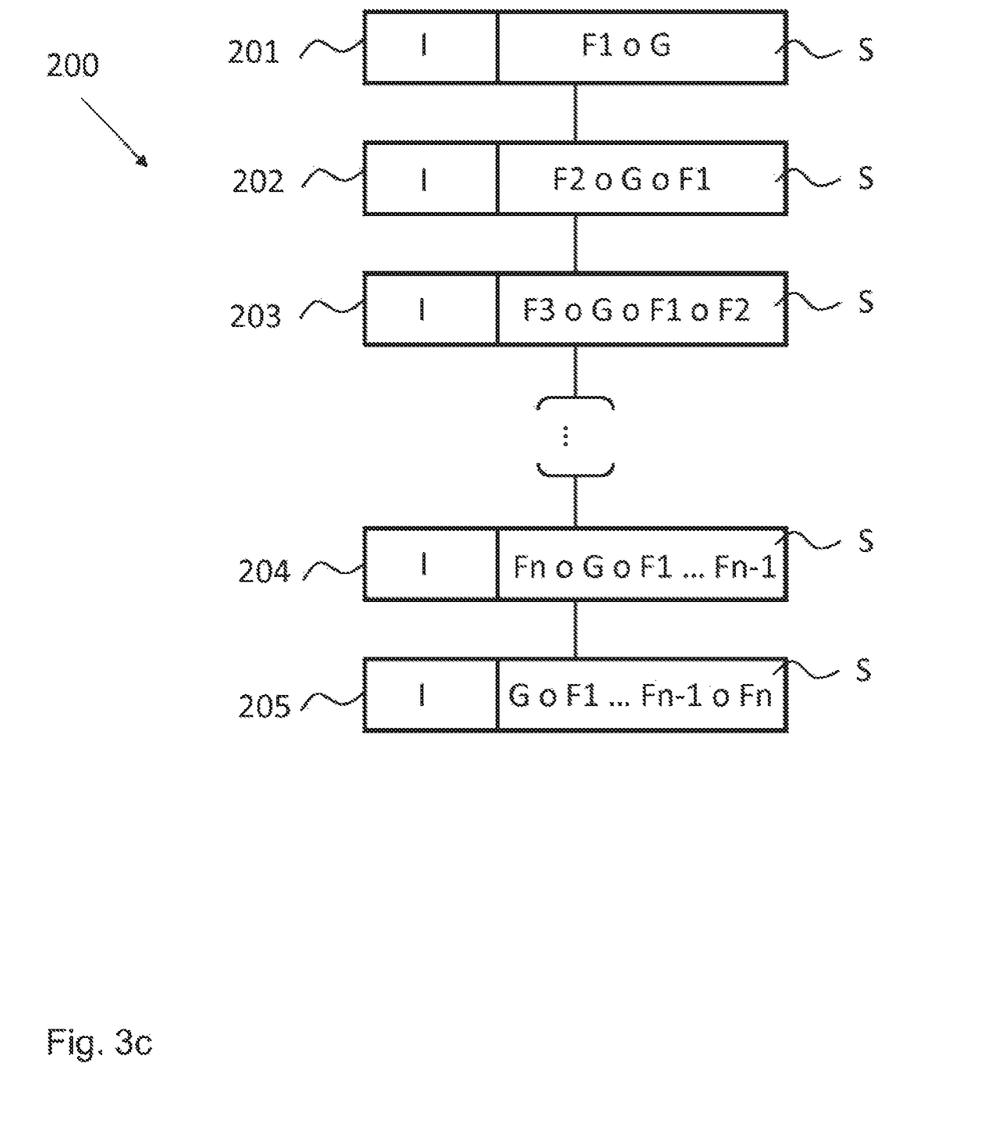
FIG. 3c shows a further schematic representation of the blockchain structure according to FIG. 3b.

FIG. 3c shows the blockchain structure 200. In FIG. 3c, the blockchain structure 200 has n interlinked data blocks, that is to say that the second data block 205 was attached to the first data block 204 by linkage. The second data block 205 is the n-th data block. The first data block 204 is the (n−1)-th data block. In each of then data blocks 201, 202, 203, . . . 204, 205 which are linked to one another, there is data to be stored in an information part I, as described for the first and second data blocks 204, 205. Furthermore, each of the n data blocks 201, 202, 203, . . . 204, 205 comprises the security part S as described for the first data block 204 and the second data block 205. A data processing rule is stored in the security part S, which links the adjacent data blocks to one another.

A start function G is stored in the start data block 201 as a data processing rule. In addition, a data processing rule F1 is stored in the security part S of the start data block 201, which is based on the data in the information part I of the subsequent data block 202. This data processing rule F1 is executed before the start function G. This is indicated by the circle operator o.

In the next data block 202, the data processing rule F1, which is based on the data of the next data block 202, is linked to the start function G, which is based on the data of the start data block 201. In addition, this linked function (G o F1) was expanded by the data processing rule F2 of the data block 203 appended to the next data block 202. The next data block 202 that follows the start data block 201 thus has the combined data processing rule (F2 o G o F1). This scheme continues. The data block 203 following this then has the combined data processing rule (F3 o G o F1 o F2).

The first data block 204 and the second data block 205 form the last data blocks of this blockchain structure. The second data block 205 is the n-th data block. The first data block 204 is the (n−1)-th data block.

Due to the linking of all data processing rules, the second data block 205, which was attached to the blockchain structure 200 as the n-th data block, has the function (G o F1 o . . . o Fn) in the security part S as a data processing rule, wherein by the dots it is represented that the data processing rules are continuously combined with one another, so that all data processing rules of all linked data blocks are linked together to form a data processing rule.

The previous data block, this means the first data block 204, comprises a combination of the first data processing rule (G o F1 o . . . Fn−1) originally stored for the first data block 204 and additionally a link to the second data processing rule Fn belonging to the n-th data block. The security part S of the n−1-th data block, this means of the first data block 204, is therefore (Fn o G o F1 o Fn−1). In this way, each data block of the blockchain structure 200 is linked bidirectionally with its neighbors. Manipulation or removal of an individual data block is thus noticeable both in all subsequent data blocks and in the preceding data block.

This series of data processing rules generates a clear order of data processing rules. The sequence of the individual data processing rules can be clearly assigned to a data block within the combined data processing rules. For example, the order of the first data processing rule A and the second data processing rule B within the third data processing rule is unambiguous for the second data block 205.

Figure 4:
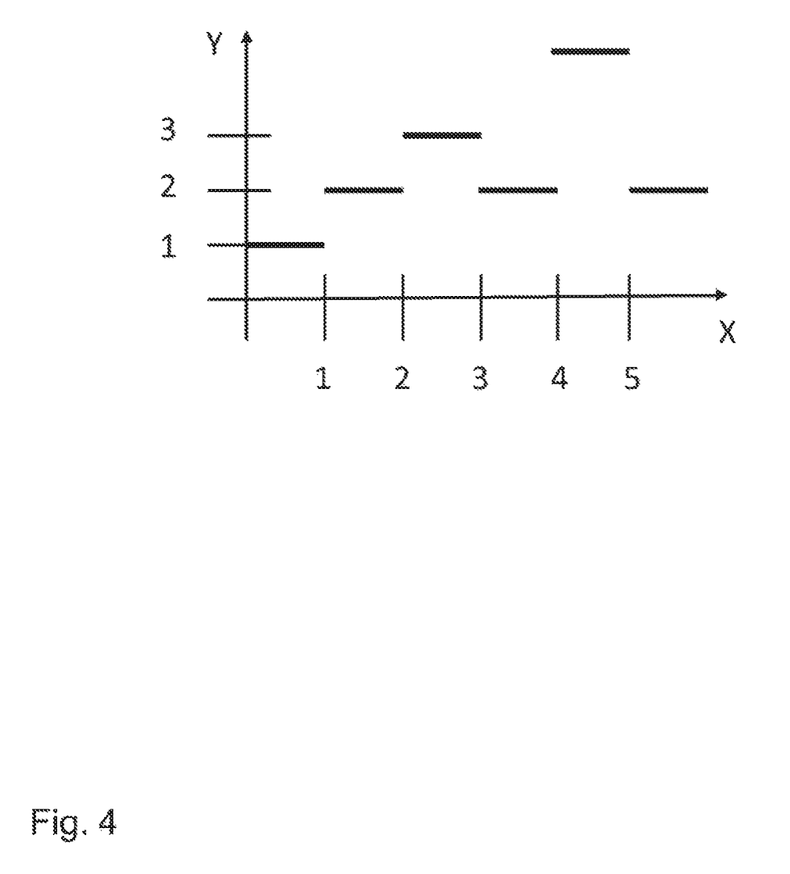
FIG. 4 shows a graphical representation of a data processing rule according to an example of the present disclosure.

FIG. 4 shows a function that is used as a data processing rule according to the example described. The function has the value 2 in the ranges 1 to 2, 3 to 4, 4 to 5, etc. The function has the range 0 to 1, 2 to 3, 4 to 5, etc. the value ki. ki is a random natural number. The function according to FIG. 4 therefore has a constant value at predefined locations or in value ranges. In other value ranges, the function has random entries or entries that depend on the content of the data from which the function was assigned as a data processing rule.

The function that is used here as a data processing rule can have the possibility of verifying the function itself as an additional property. For example, for a known k it is known that the function is constant at this point. This enables the integrity of the function to be checked in conjunction with the known constant value k. In the example described, the function shown in FIG. 4 is constant at even values. The uneven areas vary. This property applies to all functions of the blockchain structure 200. In the example shown, all data processing rules, that is to say also the first data processing rule A and the second data processing rule B, have the constant values 2 at the even positions. Such functions have the advantage that no large structures are necessary to display and save them.

Figure 5:
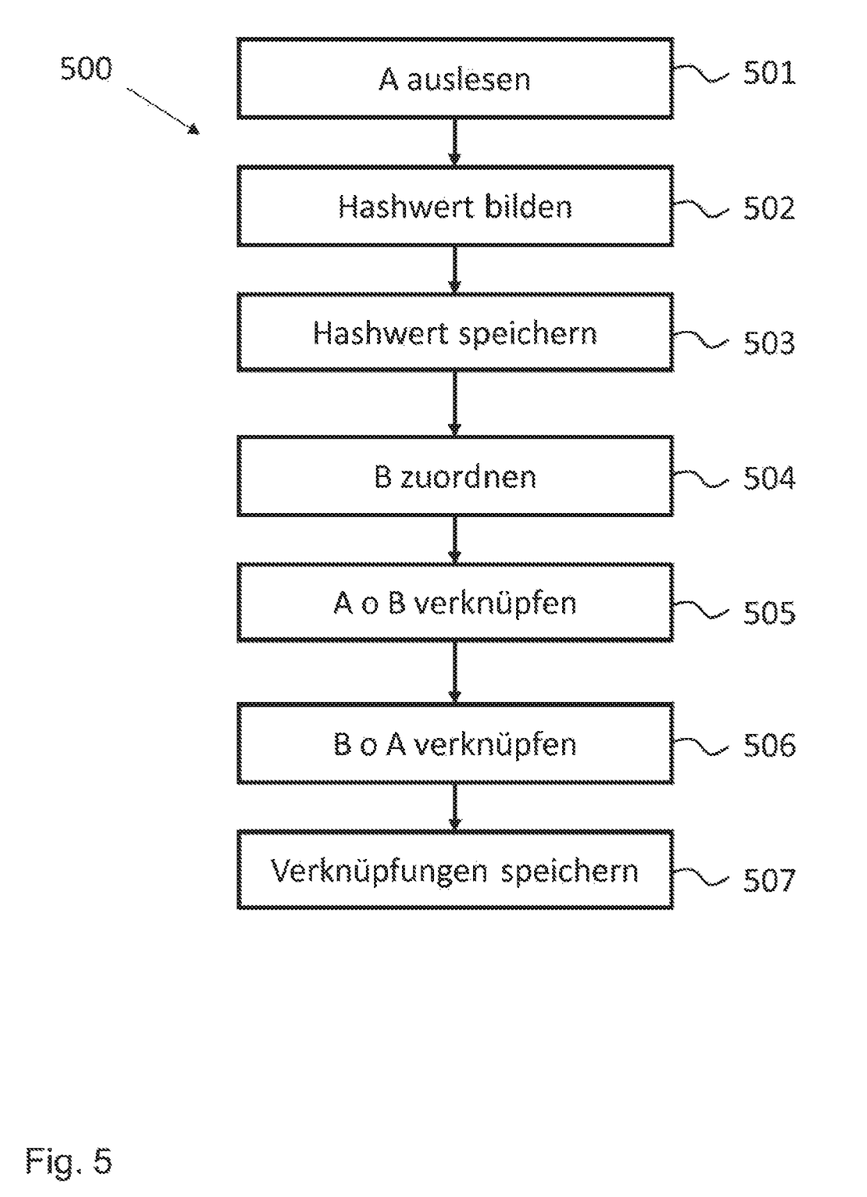
FIG. 5 shows a schematic representation of a flow diagram for a method according to an example of the present disclosure.

FIG. 5 shows a representation of a flow diagram 500 for a method according to an example. In step 501, the first data processing rule A is read from the first data block 204. For this purpose, the security part S of the first data block 204 is accessed and the first data processing rule A is read out.

In step 502, a hash value is formed from data block 204. In the example described, the hash value formation comprises the entire data block 204, this means the information part I and the security part S. In a further example, the hash value can only be formed from the information part I. The hash value has the property that the data from which the hash value was generated cannot be reconstructed from the hash value with manageable effort.

In step 503, the hash value generated in this way is stored in the information part I of the second data block 205. The storage of the hash value from the first data block 204 in the second data block 205 represents a first link between the first data block 204 and the second data block 205. This link is unidirectional, this means this is not noticeable when the second data block 205 is removed from the blockchain structure 200.

In an alternative example, method steps 502 and 503 can be dispensed with, so that no hash value is stored in the data block.

In step 504, the second data processing rule B is assigned to the second data block 205 from the information part I of the second data block 205. The assignment is based on the contents of the second data in information part I, which after execution of steps 502 and 503 also include the hash value.

The assignment of the second data processing rule B to the second data block 205 takes place on the basis of a predetermined assignment rule. In the example shown, the predetermined assignment rule is a selection from a list, based on data properties of the second data in the information part I of the second data block 205. The second data processing rule B, as described in relation to FIG. 4, is a list function. In other examples, it can also be a different analytical function, this means a locally convergent power series, such as a sine function, a cosine function.

The assignment of the second data processing rule B in step 504 comprises that the second data processing rule B has certain properties. As described in relation to FIG. 4, the second data processing rule B can comprise constant values which are characteristic of the second data block 205 or of the blockchain structure 200. A further property which the second data processing rule has, is that when the second data processing rule B is repeated in succession, a constant function is created. This property applies to a predetermined value k, for which the second data processing rule is executed in succession. For example, k is 5. Then executing the second data processing rule B five times in succession results in a constant value. The number of versions can vary in further configurations.

In step 505, the first data processing rule A of the first data block 204 is linked with the second data processing rule B of the second data block 205. For this purpose, the first data processing rule A is linked with the second data processing rule B to become a third data processing rule. The third data processing rule comprises the first data processing rule A and the second data processing rule B. The combination of the two data processing rules A, B has the consequence that the first data processing rule A and the second data processing rule B are executed in succession when the third data processing rule is executed. As a special property, the third data processing rule has defined the sequence of the first data processing specification A and the second data processing specification B such that when the third data processing specification is executed, the first data processing specification A is executed before the second data processing specification B. That is, the two data processing rules A, B are executed one after the other in a first predetermined sequence when the third data processing rule is executed.

In step 506, the second data processing rule B is linked to the first data processing rule A in order to obtain a fourth data processing rule. Here, the linkage takes place as described in step 505, but in a second order, which is different from the first order from step 505. This means that when the fourth data processing rule is executed, the second data processing rule B is executed first and then the first data processing rule A.

In step 507, the third data processing rule from step 505 is stored in the second data block in the security part S, wherein the second data processing rule assigned in step 504, which is stored there, is overwritten. Furthermore, the fourth data processing rule is stored in the first data block 204. Here, the fourth data processing rule is stored in the first security part S, the first data processing rule A being overwritten.

In an alternative example, steps 505 and 506 can be interchanged or coincide. In a further additional or alternative example, the storage of the third data processing rule and the fourth data processing rule from step 507 can each be executed individually, so that a step for storing the third data processing rule and a step for storing the fourth data processing rule is executed. Likewise, the storage cannot include overstoring of the first data processing rule A and/or the second data processing rule B, but the third data processing rule and the fourth data processing rule can also be stored in a new memory area, with a logical assignment of the respective data block 204 or data block 205 is redefined so that the memory areas result in a logically new data block.

Figure 6:
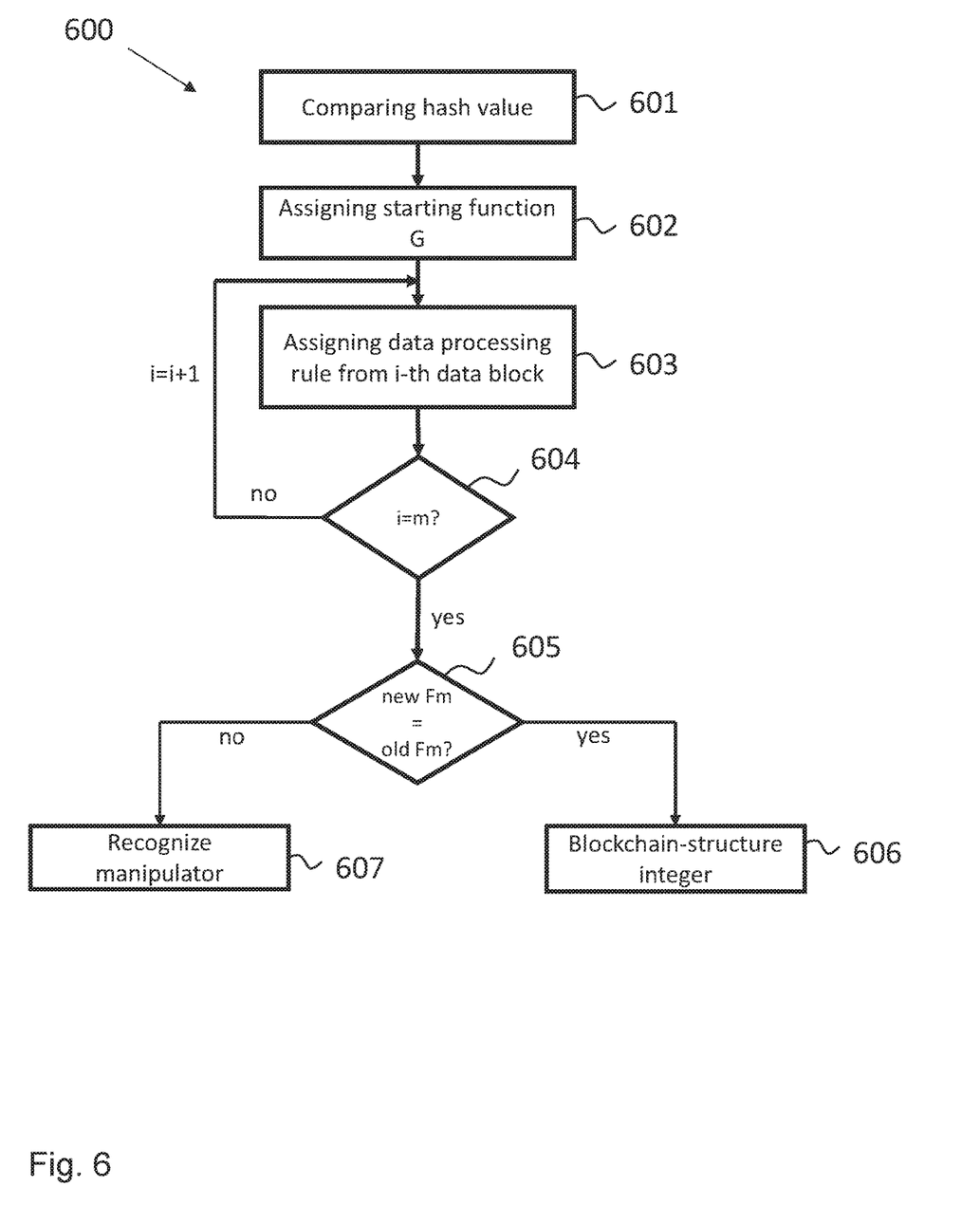
FIG. 6 shows a schematic representation of a flow diagram for a method according to a further example of the present disclosure.

FIG. 6 shows a flowchart for a method for checking the integrity of a blockchain structure 200. In the example described, the blockchain structure 200 that is checked was created using the method described above for FIG. 5 and for the linking of the individual data blocks comprises the data processing rules described above.

In the example described, the integrity of the blockchain structure 200 is to be checked, at a m-th data block in the blockchain structure 200.

In step 601, a hash value is formed from the (m−1)-th data block, and the hash value stored in the m-th data block is compared with the formed hash value. If both hash values are identical, this is a first indication that the blockchain structure 200 has not been manipulated.

In step 602, the start function G is determined again for the start block 201, as described above, by an assignment from the data that is stored in the information part I of the start block 201.

In step 603, the data processing rule Fi is calculated for a subsequent block i. Step 603 is repeated until i equals m. That is, the data processing rules that are written in the data blocks starting from the start block 201 to the data block to be checked at the m-th position in the blockchain structure are calculated again, starting with the start block 201.

For this purpose, the individual data processing rules are assigned to the respectively associated data block i and the data blocks are linked to one another. The linking and assignment of the data processing rules is repeated until the position of the m-th data block to be checked is reached. For this purpose, it is checked in step 604 whether i is equal to m. That is, after executing step 602, step 603 is repeated m times. According to another example step 602 is then merged with step 603, so that the start function G is determined as the first step and the data processing rules of the following m data blocks are determined in the subsequent examples of the combined step.

After the m-th repetition of step 603, the function Fm thus obtained is compared with the function Fm in step 605, which is already stored in the m-th data block.

If the comparison reveals that the newly determined function Fm is identical to the function Fm stored in the m-th data block, the comparison result is positive.

If the comparison from step 605 is positive, a positive confirmation is output in step 606. The integrity of the blockchain structure 200 is therefore given and is not endangered.

However, if the comparison of the newly determined function Fm with the function Fm stored in the security part S of the m-th data block is negative, then there is an integrity problem in the blockchain structure 200. A corresponding warning message is output in step 607.

Figure 7:
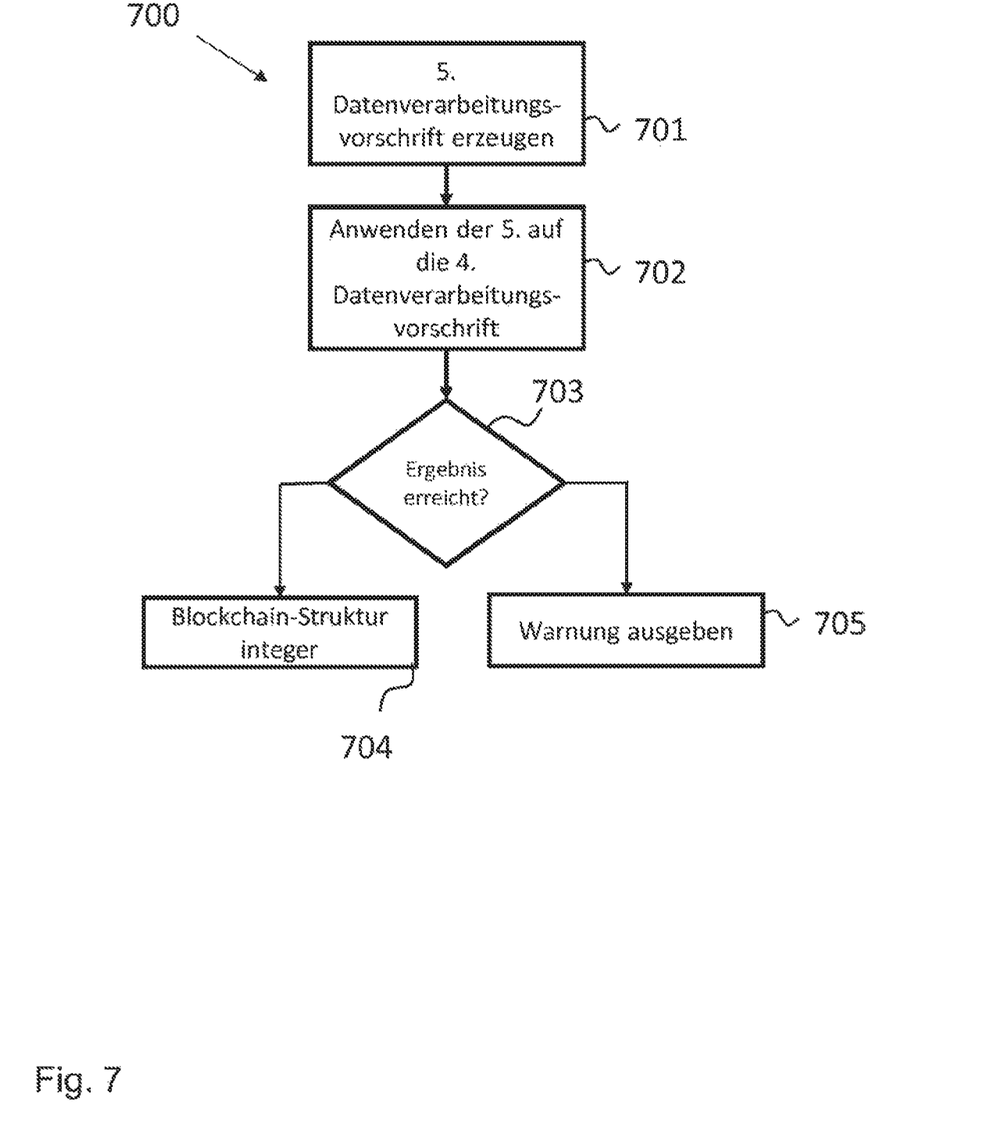
FIG. 7 shows a schematic representation of a flowchart for a method according to a further example of the present disclosure.

FIG. 7 shows a further flowchart for a further checking method for checking the integrity of a blockchain structure. As described for the method for FIG. 6, this method relates to a blockchain structure 200 that was created, for example, with the method described for FIG. 5. In particular, the blockchain structure 200, which is checked using the method described in FIG. 7, has a linkage of the first data block 204 and the second data block 205 according to method steps 505 to 507 according to FIG. 5. The method described for FIG. 7 can be used in addition or as an alternative to the method for checking the blockchain structure described for FIG. 6.

In step 701, a fifth data processing rule is assigned to the second data block 205. The fifth data processing rule is based on the second data of the second data block 205, which are stored in the information part I. Furthermore, the assignment of the fifth data processing rule is based on the assignment of the second data processing rule B, in particular the predetermined assignment rule with which the second data processing rule B was created.

As stated above, the second data processing rule B has certain properties. In the example, the second data processing rule B has the property that it results in a constant value when executed k times in succession. For example, if the second data processing rule B is executed five times in succession, a constant value is generated. Here, the number k for which the second data processing rule B is executed in succession is predetermined and is defined when the assignment rule for the second data processing rule B is created.

This property can be used in step 701 to select a property of the fifth data processing rule such that a sequential execution of the second data processing rule B and the fifth data processing rule has a predetermined property.

In the example, the fifth data processing rule is selected so that a successive execution of the fifth data processing rule and the second data processing rule B results in a constant value. In the selected example, this can be achieved in that the fifth data processing rule is created by executing the second data processing rule B one after the other, wherein the second data processing rule B is executed one after the other one time less than is necessary in order to generate a constant value.

If, for example, the second data processing rule B is set such that it results in a constant value for five successive executions, the assignment can be executed in step 701 in such a way that the fifth data processing rule is created in such a way that the second data processing rule B k−1, this means four times in a row.

In step 702, the fifth data processing rule is applied to the fourth data processing rule. The fourth data processing rule is based on the second data processing rule B and the first data processing rule A. In the fourth data processing rule, the second data processing rule B is executed before the first data processing rule A. If the fifth data processing rule is executed before the fourth data processing rule, the fifth data processing rule is executed before the second data processing rule B and this before the first data processing rule A. That is, when the fifth data processing rule comprises executing the second processing rule B k−1 times and then subsequently executing the second data processing rule B, then the second data processing rule B is executed at a total of k times. The execution of the fifth data processing rule and the fourth data processing rule thus results in a constant value. If the first data processing rule A is subsequently executed in respect to the constant value, this does not change the fundamental property that a constant value arises.

In step 703, it is checked whether the result of executing the fifth data processing rule before the fourth data processing rule corresponds to the predetermined result. That is, in the example described, it is checked whether the execution of the fifth data processing rule before the fourth data processing rule results in a constant value.

If this is the case, the integrity of the blockchain structure is confirmed in step 704. There was no manipulation. If the check in step 703 is negative, for example no constant value is generated, a warning is issued in method step 705 that the integrity of the blockchain structure 200 could have been manipulated.

Figure 8:
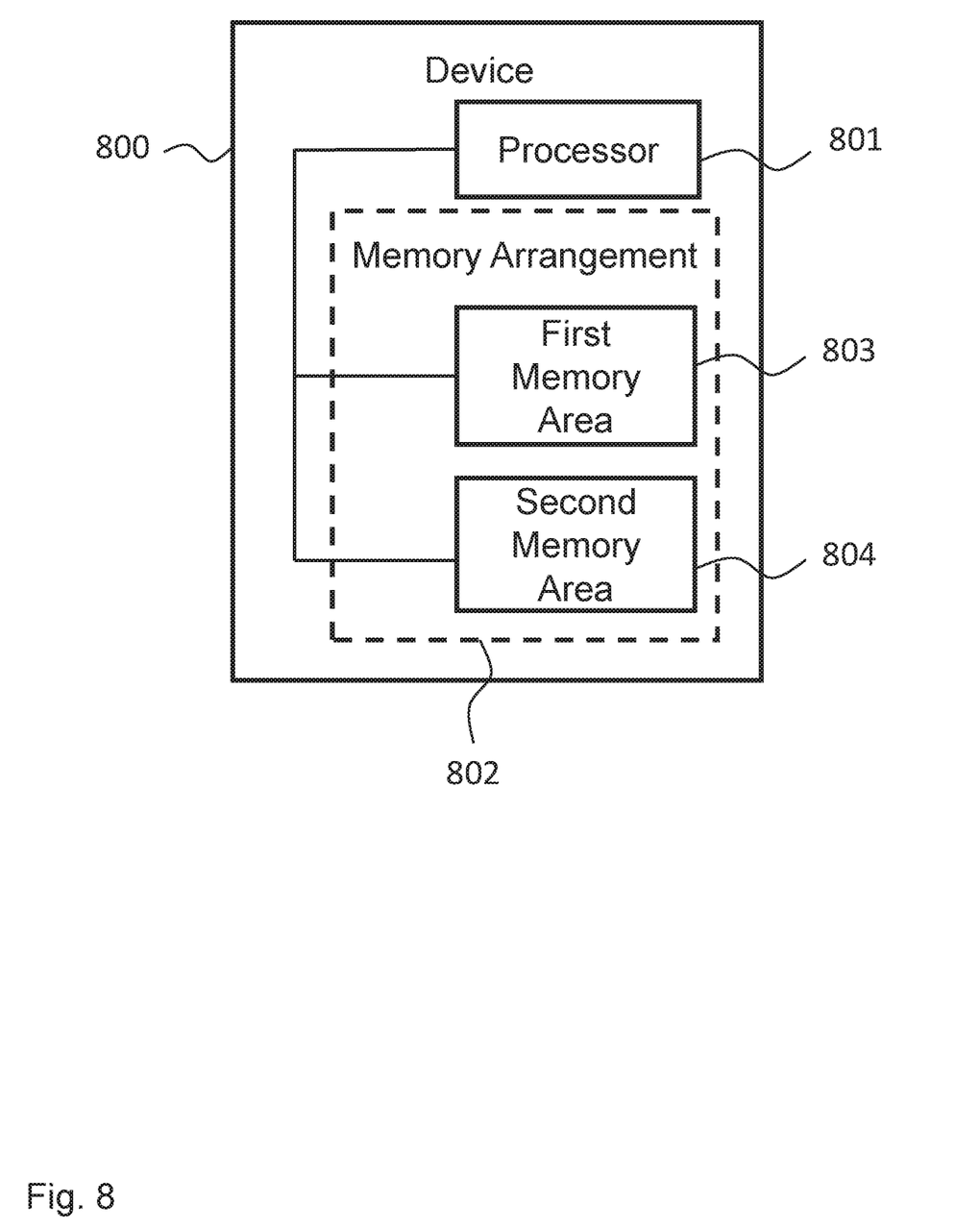
FIG. 8 shows a schematic representation of a device according to an example of the present disclosure.

FIG. 8 shows a device 800. The device 800 in the example shown is a computer system, in particular a server computer system. The device 800 comprises a processor 801 and a memory arrangement 802. The memory arrangement 802 comprises a first memory area 803 and a second memory area 804. In the example shown, the memory area 802 is a hard disk of the device 800. The first memory area 803 and the second storage area 804 are logical areas in the hard disk. In an alternative example, the memory arrangement 802 can also be a plurality of individual data memories, wherein the data memories can comprise a hard disk, a tape storage drive, volatile and non-volatile flash memories and the like.

The first memory area 803 and the second memory area 804 can be arranged in the same memory at one location, but can also be arranged distributed over a plurality of locations. If the memory arrangement 802 comprises a plurality of memories, for example in a cloud, the individual memory areas, in particular the first memory area 803 and the second memory area 804, can be arranged in a distributed manner. The first memory area 803 stores the first data block 204, and the second data block 205 is stored in the second memory area 804. The first data block 205 is, for example, an online transaction that posts financial data. The first data block 204 comprises the transaction data and additional security data. The second data block 205 has a comparable data content in the second memory area 804. The processor 801, in the example described a CPU of the server, is set up to process data.

The processor 801 is set up to carry out the methods described above. The processor 801 can link the first data block 204 in the first memory area 803 with the second data block 205 in the second memory area 804 to create a blockchain structure 200. The link is made at the logical level and comprises the storage of data processing rules for the respective data block in the associated memory area.

In an alternative example not shown in the figures, the last data block of the blockchain structure is the second data block and the additional data block which is to be appended to the blockchain structure by means of the linking described above is the first data block. Based on this swapping of the data blocks, alternative data processing rules result from the application of the above methods, which likewise result in a bidirectional linking of the individual data blocks of the blockchain structure.

REFERENCE LIST 100, 202, 203 data block
200 blockchain structure
201 start data block
204 first data block
I information part
S safety part
205 second data block
500, 600, 700 flowchart
501-507 method step
601-607 method step
701-705 method step
800 device
801 processor
802 memory arrangement
803 first memory area
804 second memory area
A first data processing rule
B second data processing rule
G, F, F1, F2, F3, Fn, Fn−1 function

What is claimed is:

1. A method for obtaining a block chain structure, comprising:
    providing a first data block comprising first data to which a first data processing rule is assigned and a second data block comprising second data;
    assigning a second data processing rule to the second data block based on the second data of the second data block;
    obtaining a third data processing rule by linking the first data processing rule with the second data processing rule, wherein the first data processing rule is executed before the second data processing rule when the third data processing rule is executed;
    obtaining a fourth data processing rule by linking the second data processing rule with the first data processing rule, wherein the first data processing rule is executed after the second data processing rule when the fourth data processing rule is executed; and
    storing the third data processing rule in the second data block and storing the fourth data processing rule in the first data block to obtain the block chain structure.

2. The method according to claim 1, wherein assigning the second data processing rule comprises assigning by means of a predetermined assignment rule, wherein the predetermined assignment rule assigns the second data processing rule to the second data or a data property of the second data.

3. The method according to claim 2, f wherein according to the predetermined assignment rule, the second data processing rule is assigned to the second data block if a multiple execution of the second data processing rule provides a predefined result.

4. The method according to claim 1, wherein the first data processing rule and the second data processing rule represent a mathematical function, wherein the mathematical function is an analytical function.

5. The method according to claim 1, further comprising:
storing the assigned second data processing rule to the second data block before linking the first data processing rule with the second data processing rule and linking the second data processing rule with the first data processing rule;
wherein storing the third data processing rule in the second data block comprises replacing the second data processing rule with the third data processing rule.

6. The method according to claim 1, wherein in addition the following step is executed:
reading out the first data processing rule from the first data block before linking the first data processing rule with the second data processing rule and linking the second data processing rule with the first data processing rule.

7. The method according to claim 1, further comprising:
creating a hash value based on the first data and the first data processing rule of the first data block and storing the hash value to the second data in the second data block prior to assigning the second data processing rule to the second data block.

8. The method according to claim 1, wherein the second data processing rule comprises a hash property, wherein the second data cannot be reconstructed from the second data processing rule.

9. A method for checking the integrity of a block chain structure, comprising:
obtaining the block chain structure, wherein the block chain structure links a first data block with a second data block, wherein the first data block comprises first data and wherein the second data block comprises second data, wherein a first data processing rule is assigned to the first data and a second data processing rule is assigned to the second data, wherein the second data block comprises a link of the first data processing rule and the second data processing rule to a third data processing rule, wherein the first data block comprises a link of the first data processing rule and the second data processing rule to a fourth data processing rule, wherein the second data processing rule is configured to be executed after the first data processing rule when the third data processing rule is executed, wherein the second data processing rule is configured to be executed before the first data processing rule when the fourth data processing rule is executed;
assigning a fifth data processing rule to the second data block based on the second data of the second data block and assigning the second data processing rule to the second data;
executing the fifth data processing rule in a predetermined order with the fourth data processing rule to obtain an execution result; and
confirming the integrity of the block chain structure when the execution result corresponds to a predetermined reference result.

10. The method according to claim 9, wherein the second data processing rule has the property that when the second data processing rule is executed several times in succession according to a predetermined number of executions, a constant value is generated, and wherein the fifth data processing rule is formed by executing the second data processing rule several times in succession by one time less than the predetermined number of executions.

11. The method of claim 10, wherein the integrity of the block chain structure is confirmed if the execution result is a constant value.

12. A method for checking the integrity of a block chain structure, comprising:
obtaining the block chain structure, wherein the block chain structure links a first data block with a second data block, wherein the first data block comprises first data and wherein the second data block comprises second data, wherein a first data processing rule is assigned to the first data and a second data processing rule is assigned to the second data, wherein the second data block comprises a link of the first data processing rule and the second data processing rule to a third data processing rule, wherein the first data block comprises a link of the first data processing rule and the second data processing rule to a fourth data processing rule, wherein the second data processing rule is configured to be executed after the first data processing rule when the third data processing rule is executed, wherein the second data processing rule is configured to be executed before the first data processing rule when the fourth data processing rule is executed; assigning a further second data processing rule to the second data block based on the second data of the second data block;
assigning a further first data processing rule to the first data block based on the first data of the first data block
obtaining a further third data processing rule by linking the further first data processing rule with the further second data processing rule;
comparing the third data processing rule with the further third data processing rule; and
confirming the integrity of the block chain structure if the result of the comparison shows that the third data processing rule matches the further third data processing rule.

* * * * *